(12) United States Patent
Iwamura et al.

(10) Patent No.: US 6,467,004 B1
(45) Date of Patent: Oct. 15, 2002

(54) PIPELINED SEMICONDUCTOR DEVICES SUITABLE FOR ULTRA LARGE SCALE INTEGRATION

(75) Inventors: Masahiro Iwamura; Shigeya Tanaka; Takashi Hotta; Tatsumi Yamauchi, all of Hitachi; Kazutaka Mori, Hiqashiyamato, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/477,448

(22) Filed: Jan. 4, 2000

Related U.S. Application Data

(62) Division of application No. 07/957,914, filed on Oct. 8, 1992, now Pat. No. 6,029,220.

(30) Foreign Application Priority Data

Oct. 9, 1991 (JP) .............................. 3-261729

(51) Int. Cl.⁷ ................................................ G06F 9/38
(52) U.S. Cl. ....................................... 710/126; 712/32
(58) Field of Search ............................ 710/126; 712/32

(56) References Cited

U.S. PATENT DOCUMENTS

| | | | |
|---|---|---|---|
| 4,025,771 A | 5/1977 | Lynch, Jr. et al. | |
| 4,577,327 A | 3/1986 | Nambu | |
| 4,649,512 A | 3/1987 | Nukiyama | |
| 4,658,359 A | 4/1987 | Nukiyama | |
| 4,882,704 A | 11/1989 | Komori et al. | |
| 5,132,987 A | 7/1992 | Motohashi et al. | |
| 5,185,599 A | 2/1993 | Doornink et al. | |
| 5,226,149 A | 7/1993 | Yoshida et al. | |
| 5,243,238 A | 9/1993 | Kean | |
| 5,280,597 A | 1/1994 | Takata et al. | |
| 5,371,863 A | 12/1994 | Silver | |
| 5,390,300 A | 2/1995 | Pribnow et al. | |
| 5,392,423 A | 2/1995 | Yetter | |
| 5,434,520 A | 7/1995 | Yetter et al. | |
| 5,535,408 A | 7/1996 | Hillis | |
| 5,598,408 A | * 1/1997 | Nickolls et al. | ............ 370/351 |
| 5,619,151 A | 4/1997 | Akioka et al. | |

OTHER PUBLICATIONS

ISSCC 87, Feb. 27, 1987, pp. 256–257.
U.S. Ser. No. 07/630,553, filed Dec. 20, 1990.

\* cited by examiner

Primary Examiner—John A. Follansbee
(74) Attorney, Agent, or Firm—Antonelli, Terry, Stout & Kraus, LLP

(57) ABSTRACT

A high speed, high performance pipelined semiconductor device is provided, such as a pipelined data processing device and memory device. In the pipeline operation, a functional circuit unit and a transmission unit are separately controlled at each pipeline stage cycle. A transmission unit between two functional circuit units is divided into N transmission units while considering a cycle time, and each divided transmission unit is assigned one pipeline stage cycle.

12 Claims, 17 Drawing Sheets

F I G. 21
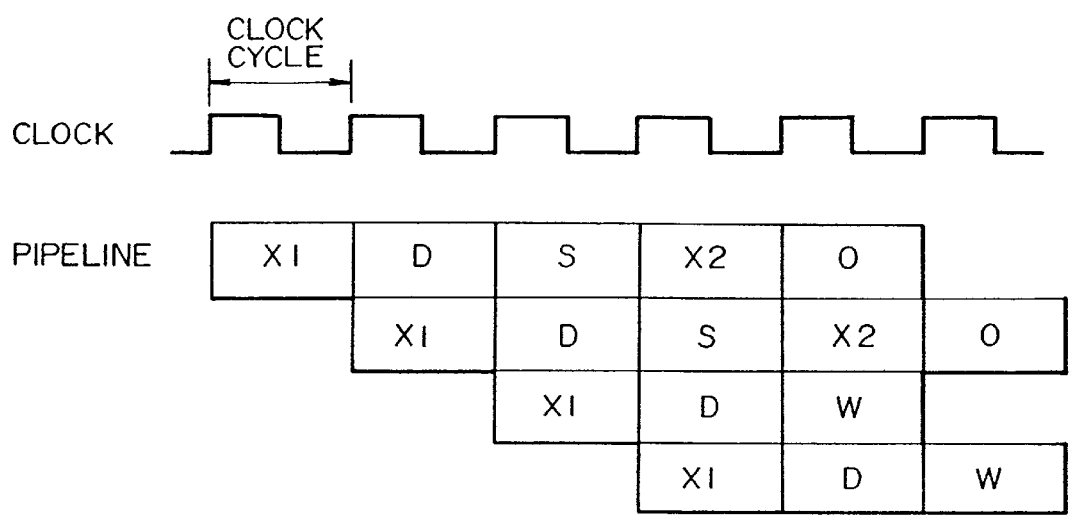

US 6,467,004 B1

PIPELINED SEMICONDUCTOR DEVICES SUITABLE FOR ULTRA LARGE SCALE INTEGRATION

CROSS-REFERENCE TO RELATED APPLICATIONS

This application is a divisional of U.S. application. Ser. No. 07/957,914, filed Oct. 8, 1992, now U.S. Pat. No. 6,029,220 and is hereby incorporated by reference. This application is also related to U.S. application Ser. No. 08/463,563, filed Jun. 5, 1995, now abandoned, which is also hereby incorporated by reference.

BACKGROUND OF THE INVENTION

1. Field of the Invention

The present invention relates to pipelined semiconductor devices suitable for ultra large scale integration (ULSI), such as pipelined data processing devices, pipelined memory devices, and the like.

2. Description of the Related Art

Pipeline control is widely used for data processing devices typically microprocessors, and memory devices, in order to speed up the operation. An example of a pipelined microprocessor is disclosed for example in IEEE JOURNAL OF SOLID-STATE CIRCUITS, Vol. SC-19, No. Oct. 5, 1984, at pp. 682 to 689. An example of a pipelined memory is disclosed for example in ISSCC 87 February, 1987, at pp. 256 to 257.

FIG. 23 shows the general structure of a prior art pipelined data processing device. In FIG. 23, reference numeral 2300 represents a data processing device having functional blocks 2310 and 2320. The functional block 2310 has an input latch 2311 and a functional circuit unit 2312. The functional block 2320 has an input latch 2321 and a functional circuit unit 2322. The functional blocks 2310 and 2320 are inter-connected by a signal transmission line 240 whose equivalent circuit model is represented by a wiring resistor 241 and a wiring capacitor 242.

FIG. 24 illustrates the pipeline operation of the data processing device shown in FIG. 23. In FIG. 24, a character "A" stands for a clock cycle during which the process by the functional block 2310 and the signal transmission by the signal transmission line 240 are executed. A character "B" stands for a clock cycle during which the process by the functional block 2320 is executed. The characteristic feature common in conventional techniques is that the process time "A" contains not only the process time of the functional block 2310 but also the signal transmission time by the signal transmission line 240.

FIG. 25 shows a typical chip layout of a general semiconductor memory device. In FIG. 25, reference numeral 2500 represents a chip of the semiconductor memory device. Reference numerals 2510-1 to 2510-8 represent memory arrays. Reference numerals 2520-1 to 2520-7 represent address decoders. Reference numerals 2530-1 to 2530-8 represent inner peripheral circuits each including a column select switch, a sense amplifier, and the like. Reference numerals 2540-1 and 2540-2 represent pad areas. Reference numeral 2550-1 represents an outer peripheral circuit including an address input circuit. Reference numeral 2550-2 represents an outer peripheral circuit including an output driver circuit. A signal line 2560 supplies an address signal from the peripheral circuit 2550-1 to the address decoders 2520-1 to 2520-7, and is a long wiring extending in the longitudinal direction of the chip 2500. Another signal line 2570 transfers a signal between the inner peripheral circuits 2530-1 to 2530-8 and the outer peripheral circuit 2550-2, and is also a long wiring extending in the longitudinal direction of the chip 2500. In the pipeline operation of the semiconductor memory device having such long wirings, one pipeline cycle contains both the process time by the functional circuit unit and the signal transmission time by the signal line 2560 or 2570, similar to the data processing device described above.

A significant issue with the above-described conventional technique is that one pipeline cycle contains not only the process time by the functional circuit unit which varies depending upon a device performance and circuit configuration, but also the signal transmission time which varies depending on the material, structure, and length of the wiring. The performance of the functional circuit unit can be improved through introduction of a high performance device due to the advancement of fine processing technique, and high speed circuit configuration. On the other hand, however, wiring resistance and capacitance increase as the fine processing technique advances, lengthening the signal transmission time. Accordingly, the pipeline cycle cannot be shortened to the extent as expected, but to make matters worse, the pipeline cycle is required to be lengthened.

FIG. 26 is a graph illustratively showing how an increase in the signal transmission time on a wiring becomes a serious obstacle against realizing a future high speed ULSI semiconductor device, when a conventional pipeline operation is applied. In FIG. 26, it is assumed that in the fine processing generation S0, the operation frequency is 33 MHz, the circuit delay time is 27.9 ns, and the wiring delay time is 2.1 ns, and that the circuit performance is improved by 150% in each new generation through scaling and the wiring delay time increases by 150% in each new generation in a conservative estimate.

The solid line curve of FIG. 26 shows an ideal operation frequency to be expected from an improved device performance caused by the advancement of fine processing technique, without considering the wiring delay time. The broken line curve of FIG. 26 shows an operation frequency to be expected when considering the wiring delay time. As seen from FIG. 26, in the ideal case neglecting the wiring delay time, the operation frequency can be speeded up to about 270 MHz in the generation S5. However, when considering the wiring delay time, the operation frequency is improved only by two times over three generations from the generation S0 with 33 MHz to the generation S3 with a peak operation frequency of about 65 MHz. Starting from the generation S4 with much advanced fine processing technique, the operation frequency decreases. In the next generation S5, only the operation frequency of about 51 MHz can be realized which is about one fifth the ideal case. The following solutions to the above-described wiring delay problem are conceivable:

(1) Use of wide wiring and a buffer having a high speed and large load driving capability.

(2) Development of a new wiring material providing small resistance and capacitance.

(3) Development of a new layout providing short wiring, such as three-dimensional layout.

(4) Improvement of a system providing a short wiring.

Although the solution (1) can be practiced, the high integration of an ULSI chip is sacrificed, and so this solution (1) cannot be used in practice. The solutions (2) and (3) require a possible long term for researche and development. These techniques have not been established as yet. For the solution (4), a particular and fundamental means is not still realized. A circuit layout design for minimizing a signal delay of a wiring has been proposed in U.S. Ser. No. 07/630,553 filed on Dec. 20, 1990 and assigned to the present assignee, which is incorporated herein by reference.

SUMMARY OF THE INVENTION

It is an object of the present invention to solve the above-described problem and provide a pipelined semiconductor device of a high speed and high performance.

The characteristic features of various aspects of the present invention achieving the above object are as follows:

(1) In a pipelined semiconductor device executing pipeline stages including a functional process and a transmission process synchronously with a clock cycle, different stages are assigned to each functional process and each transmission process.

(2) Latches are provided before and after each function block which executes a functional process.

(3) Latches are provided before and after each transmission line which executes a transmission process.

(4) A transmission line is divided into a desired number of transmission lines.

(5) A transmission line is divided into transmission lines each having an optional length.

(6) Each divided transmission line is divided by using latches.

(7) A signal transmission line between first and second functional blocks is divided into signal transmission lines each having a length equal to $1/N$ ($N \geq 1$) that of the signal transmission line before the division. Each divided signal transmission line is interposed between two latches. A pipeline operation is performed in such a manner that a time period required for a signal to transmit from one latch to another latch is synchronized with a clock cycle period.

(8) At least one of the divided signal transmission lines, each having a length equal to $1/N$ ($N \geq 1$) that of the signal transmission line before the division, has a branched signal transmission line.

(9) A uni-directional pipeline latch is provided at each of (N−1) division points between divided signal transmission lines for $N \geq 2$.

(10) A bi-directional pipeline latch is provided at each of (N−1) division points between divided signal transmission lines for $N \geq 2$.

(11) The number N of divided signal transmission lines is given by $N \geq tx/[T-(tk+tl+ts)]$, where T is a pipeline cycle time, tk is a clock skew, tl is a latch delay time, ts is a setup time, and tx is a total wiring delay time of the signal transmission line.

Microprocessors incorporating the above-described aspects have the following characteristic features:

(1) In a microprocessor executing a pipeline operation of M ($M \geq 2$) stages synchronously with a clock cycle, at least one of a plurality of stages from an instruction cache read to an operation result memory write, includes N ($N \geq 1$) signal transmission stages.

(2) N ($N \geq 1$) signal transmission stages are interposed between an instruction cache and an instruction control unit.

(3) N ($N \geq 1$) signal transmission stages are interposed between the instruction control unit and a logical/arithmetic operation unit.

(4) N ($N \geq 1$) signal transmission stages are interposed between the logical/arithmetic operation unit and a register file.

(5) N ($N \geq 1$) signal transmission stages are interposed between the register file and a data cache.

(6) N ($N \geq 1$) signal transmission stages are interposed between an internal memory and an input/output control unit.

(7) A signal transmission line for each signal transmission stage is a wiring interconnecting functional blocks.

(8) A signal transmission line for each signal transmission stage is a wiring interconnecting functional blocks and a delay element or waveform shaping buffer inserted at the midst of the wiring.

Multi-microprocessors incorporating the above-described aspects have the following characteristic features:

(1) A multi-microprocessor having M microprocessors integrally fabricated on a semiconductor chip, has N ($N \geq 1$) signal transmission stages connecting together each microprocessor and a repeater including a pipeline latch, and 2N ($N \geq 1$) signal transmission stages for the signal transmission between two microprocessors.

(2) A signal transmission line corresponding to signal transmission stages is constructed of only a wiring connecting each microprocessor.

(3) A signal transmission line corresponding to signal transmission stages is constructed of a wiring connecting each microprocessor and a delay element or waveform shaping buffer inserted in the midst of the wiring.

(4) Signal transmission lines connecting M microprocessors are assigned to M buses connected to repeaters including pipeline latches.

(5) M microprocessors are disposed to enclose the repeaters including pipeline latches.

(6) Each repeater for controlling the signal transmission between microprocessors is constructed of only bus switching means including a pipeline latch.

(7) Each repeater for controlling the signal transmission between microprocessors includes bus switching means including a pipeline latch, and a clock generator.

(8) Each repeater for controlling the signal transmission between microprocessors is one of a data processing device, a memory device, and a functional device each including bus switch means having a pipeline latch.

Semiconductor memory devices incorporating the above-described aspects have the following characteristic features:

(1) A semiconductor memory device executing a pipeline operation synchronously with a clock cycle includes N ($N \geq 1$) signal transmission lines corresponding to N signal transmission stages, between an address input circuit to a read data output circuit.

(2) N ($N \geq 1$) signal transmission lines corresponding to N signal transmission stages, are provided between a write control signal input circuit and a write control circuit and between a write data input circuit and the write control circuit.

(3) N ($N \geq 1$) signal transmission lines corresponding to N signal transmission stages, are provided between the address input circuit and a decoder circuit.

(4) N ($N \geq 1$) signal transmission lines corresponding to N signal transmission stages, are provided between a sense circuit and the read data output circuit.

(5) N ($N \geq 1$) signal transmission lines corresponding to N signal transmission stages, are provided between the address input circuit and the decoder circuit and between the sense circuit and the read data output circuit.

Multi-chip module systems incorporating the above-described aspects have the following characteristic features:

(1) A multi-chip module system having a plurality of LSI chips on a module substrate, has N (N≧1) signal transmission stages connecting together, each LSI chip and a repeater chip including a pipeline latch, and 2N (N ≧1) signal transmission stages connecting together two LSI chips.

(2) N (N≧1) signal transmission stages connecting together each LSI chip a repeater chip including a pipeline latch, 2N (N≧1) signal transmission stages connecting together two LSI chips, and the highest operation frequency of the system is determined from the lowest rated lowest operation frequency of the plurality of LSI chips.

(3) Each repeater for controlling the signal transmission between LSI chips is constructed of only bus switching means including a pipeline latch.

(4) Each repeater for controlling the signal transmission between LSI chips includes bus switching means including a pipeline latch, and a clock generator.

(5) Each repeater for controlling the signal transmission between LSI chips is one of a data processing device, a memory device, and a functional device each including bus switch means having a pipeline latch.

According to the aspects of the present invention, a signal transmission line is divided into N signal transmission lines in accordance with a pipeline cycle satisfying the performance condition of each circuit. Each divided signal transmission line is assigned a dedicated pipeline stage. Accordingly, each divided signal transmission line is required only to transmit a signal within a predetermined cycle time, so that the transmission delay at each divided signal transmission line will not hinder the performance improvement to be achieved by shortening the pipeline cycle time. Without the development of new technology which realizes the above-described solutions (1) to (4), the improved device performance through fine processing and the improved circuit performance will provide a higher operation frequency and high performance of pipelined semiconductor devices.

BRIEF DESCRIPTION OF THE DRAWINGS

FIG. 21 is a diagram illustrating the pipeline operation of the embodiment shown in FIG. 20.

DESCRIPTION OF THE PREFERRED EMBODIMENTS

The pipeline process according to the present invention will be briefly described prior to describing the embodiments of the present invention.

In the pipeline process, instructions or data are not processed in parallel simultaneously, but rather they are time sequentially processed at different processing circuits or pipeline stages in an overlapped manner, so that the processing circuit which becomes idle after processing one instruction or data, can be used in processing another instruction or data. In other words, all processing circuits are operating to process instructions or data at anytime. In this sense, it can be said that a parallel processing is being executed. However, each instruction of data is time sequentially processed and the operation is a serial processing. Assuming that the process time at each processing circuit is t and the number of processing circuits or pipeline stages is n, a process time for one instruction or data becomes n*t. However, a process time for n instructions or data becomes also n*t, providing an average process time t per one instruction or data. As described previously, a conventional processing circuit or pipeline stage contains both a functional circuit unit for processing an instruction or data and a signal transmission unit for transferring data. Therefore, there occurs the problem that although the functional circuit unit can be speeded up through fine processing technique or the like, the signal transmission unit cannot be speeded up so much. According to the present invention, in order to speed up the pipeline operation, the functional circuit unit and transmission unit of a processing circuit are separated and allocated with different pipeline stages. The signal transmission line is divided into an optional number of transmission lines or into transmission lines each having an optional length. Each divided transmission line is assigned its own pipeline stage. The present invention is applicable to all devices which operate in a pipelined manner.

The preferred embodiments of the present invention will be described with reference to the accompanying drawings.

Figure 1:
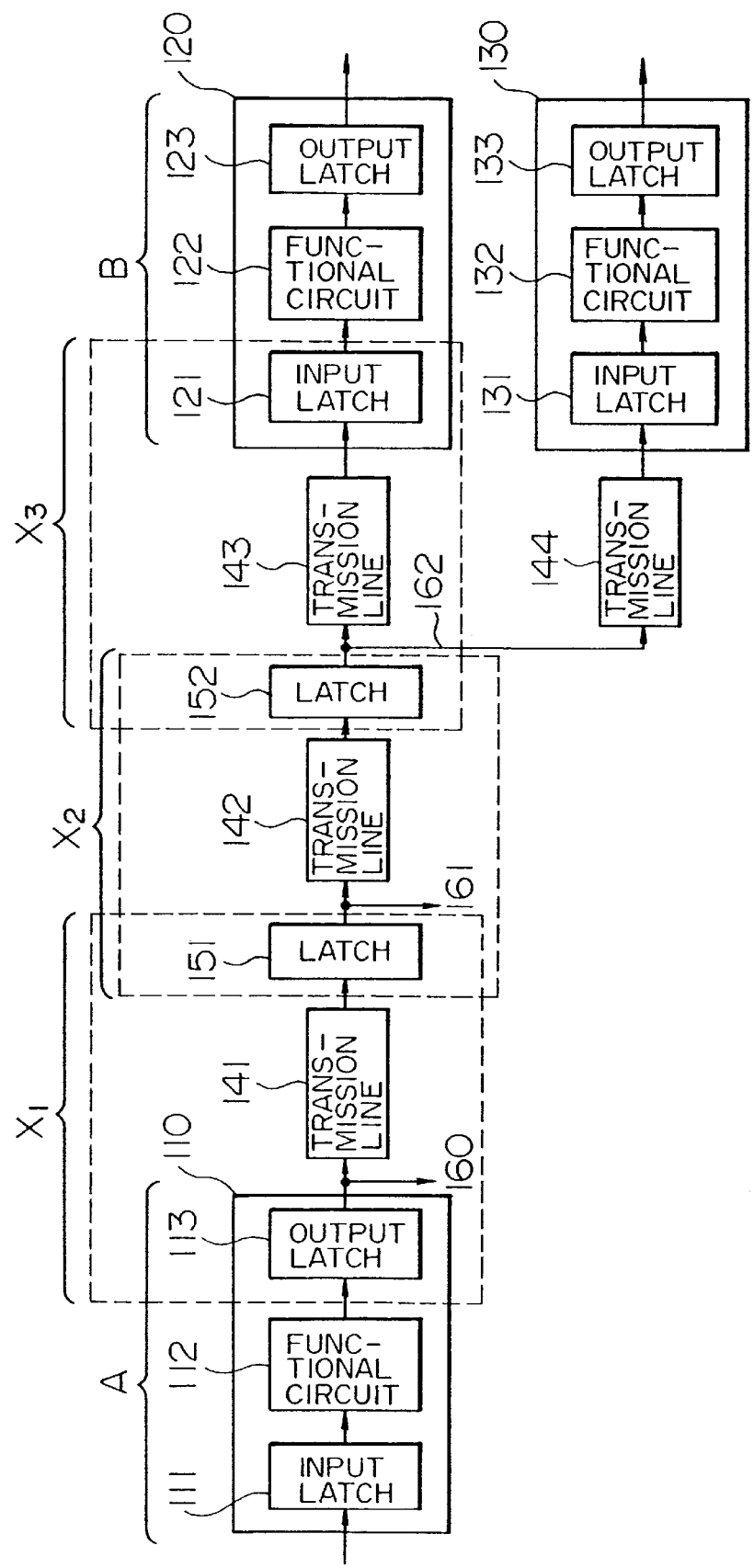
FIG. 1 is a circuit block diagram showing a first embodiment of a pipelined semiconductor device according to the present invention.
Figure 7:
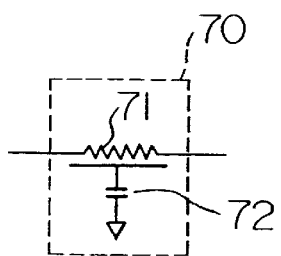
FIG. 7 is a circuit diagram showing an equivalent circuit model of the wiring of a signal transmission line.
Figure 8:
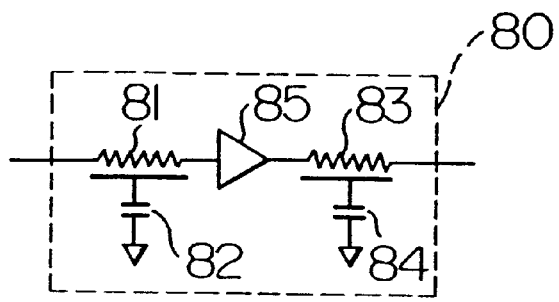
FIG. 8 is a circuit diagram of an equivalent circuit model of the wiring with a buffer of a signal transmission line.
Figure 12:
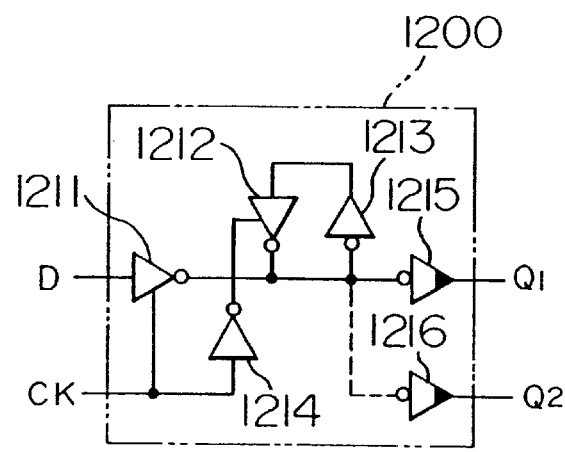
FIG. 12 is a circuit diagram showing an example of a uni-directional latch.

FIG. 1 is a circuit block diagram showing the first embodiment of a pipelined data processing device. In FIG. 1, reference numerals 110, 120, and 130 represent functional blocks of the data processing device. The functional block 110 has an input latch 111, functional circuit unit 112, and output latch 113. The functional block 120 has an input latch 121, functional circuit unit 122, and output latch 123. The functional block 130 has an input latch 131, functional circuit unit 132, and output latch 133. Reference numerals 141 to 144 represent divided signal transmission lines each being divided so as to have a transmission delay time smaller than a predetermined delay time. Each divided signal transmission line is a wiring such as shown in FIG. 7 or a combination of a wiring and a waveform shaping buffer (inclusive of a delay circuit only) inserted in the midst of the wiring such as shown in FIG. 8. Reference numerals 151 and 152 represent pipeline latches provided between the signal transmission lines 141 to 144. The pipeline latch may have the circuit configuration shown in FIG. 12, although other circuits may also be used. Such a pipeline latch is well known, and so the description thereof is omitted.

The number N of divided signal transmission lines is given by:

$$N \geq \{tx/(T-(tk+tl+ts))\} \quad (N \geq 1)$$

where tx is the wiring delay time of the original transmission line before division, T is the pipeline cycle time, tk is the skew of the cycle clock, tl is the latch delay time, and ts is the latch setup time. The time (tk+tl+ts) is a minimum necessary operation time of a latch. The pipeline cycle time T subtracted by the latch operation time (tk+tl+ts) is the time left for the signal transmission. The division number N is obtained by dividing the wiring delay time tk of the original transmission line before division by the signal transmission time.

The cycle time T is determined basically from the circuit performance of the functional blocks 110, 120, and 130. It is preferable that the transmission time at each divided transmission line be equal to or shorter than the process time at each functional block. The cycle time T is constant for each pipeline stage.

Figure 9:
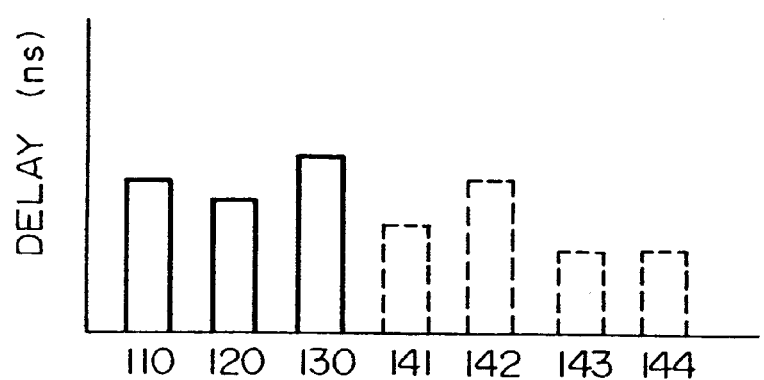
FIG. 9 is a diagram showing a distribution of delay times of functional blocks.

FIG. 9 shows examples of signal delay times at the functional blocks 110, 120, and 130, and at the signal transmission lines 141, 142, 143, and 144. The delay time at the functional block 130 is maximum, so that the cycle time T is determined by this delay time. However, if the delay time at anyone of the signal transmission lines 141, 142, 143, and 144 exceeds the delay time of the functional block 130, the cycle time is determined from the maximum delay time of the signal transmission line.

Circuit designs are required to consider a minimum delay time in order to avoid racing at the signal transmission between latches, similar to the designs of general logic circuits. Namely, the condition (racing free condition) of a minimum transmission time is given by:

$$txd > tk+th-tl$$

where txd is a transmission time at a divided signal transmission line, tk is a clock skew, tl is a latch delay time, and th is a latch hold time. Reference numerals 160 to 162 in FIG. 1 represent branched signal transmission lines.

In the above embodiment, the signal transmission line from the functional block 110 to the functional block 120 is divided into three signal transmission lines 141, 142, and 143 each sandwiched between two latches. Similarly, the signal transmission line from the functional block 110 to the functional block 130 is divided into three signal transmission lines 141, 142, and 144 each sandwiched between two latches. Each divided signal transmission line is assigned one pipeline cycle.

Accordingly, in a pipelined data processing device having a machine cycle of 500 MHz, each divided signal transmission line can use a wiring having a transmission time shorter than 2 ns.

Figure 2:
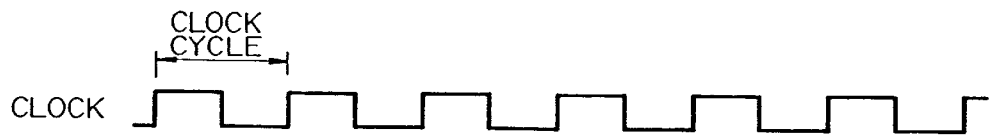
FIG. 2 is a diagram illustrating the pipeline operation of the first embodiment shown in FIG. 1.

FIG. 2 shows the pipeline operation of the embodiment shown in FIG. 1. In FIG. 2, a character "A" stands for a process stage of the functional block 110, a character "B" stands for a process stage of the functional blocks 120 and 130, characters "X1" and "X2" stand for transmission stages of the signal transmission lines 141 and 142, a character "X3" stands for a transmission stage of the signal transmission lines 143 and 144. As seen from FIG. 2, a signal outputted from the functional block 110 is processed at the functional blocks 120 and 130 after three stages. Used at the process stage "A" are the input latch 111, functional circuit 112, and output latch 113. Used at the transmission stage "X1" are the output latch 113 of the functional block 110, signal transmission line 141, and pipeline latch 151. The output latch 113 of the functional block 110 serves as an input latch at the transmission stage "X1". The similar configuration is applied to both the transmission stages "X2"0 and "X3". Namely, each signal transmission latch is sandwiched between two latches. For the pipeline operation shown in FIG. 2 and given hereinafter, it is assumed that each latch is an edge trigger type latch which operates in response to the rising edge of a clock.

Figure 3:
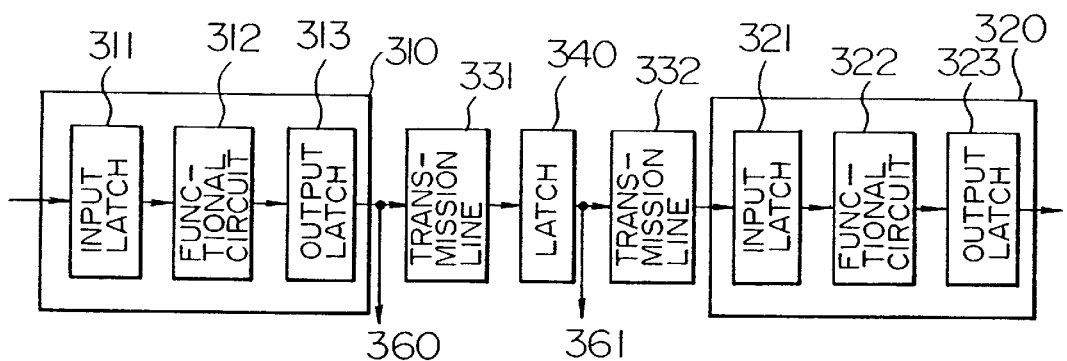
FIG. 3 is a circuit block diagram showing a second embodiment of a pipelined semiconductor device according to the present invention.

FIG. 3 shows a second embodiment of a pipelined data processing device according to the present invention. In FIG. 3, reference numerals 310 and 320 represent some functional blocks of the pipelined data processing device. The functional block 310 includes an input latch 311, functional circuit 312, and output latch 313. The functional block 320 has an input latch 321, functional circuit unit 322,.and output latch 323. Reference numerals 331 to 332 represent divided signal transmission lines, each being a wiring such as shown in FIG. 7 or a combination of a wiring and a waveform shaping buffer inserted in the midst of the wiring such as shown in FIG. 8. Reference numeral 340 represents a pipeline latch provided between the signal transmission lines 331 and 332. The pipeline latch may have the circuit configuration shown in FIG. 12, although other circuits may also be used. Reference numerals 360 and 361 represent branched signal transmission lines. In this embodiment, the signal transmission line from the functional block 310 to the functional block 320 is divided into two signal transmission lines 331 and 332 each sandwiched between two latches. Each divided signal transmission line is assigned one pipeline cycle.

Figure 4:
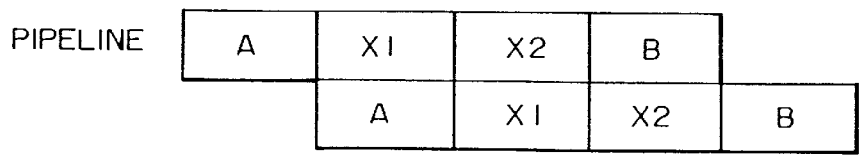
FIG. 4 is a diagram illustrating the pipeline operation of the second embodiment shown in FIG. 3.

FIG. 4 shows the pipeline operation of the embodiment shown in FIG. 3. In FIG. 4, a character "A" stands for a process stage of the functional block 310, a character "B" stands for a process stage of the functional block 320, and characters "X1" and "X2" stand for transmission stages of the signal transmission lines 331 and 332. As seen from FIG. 4, a signal output from the functional block 310 is processed at the functional block 320 after two stages.

Figure 5:
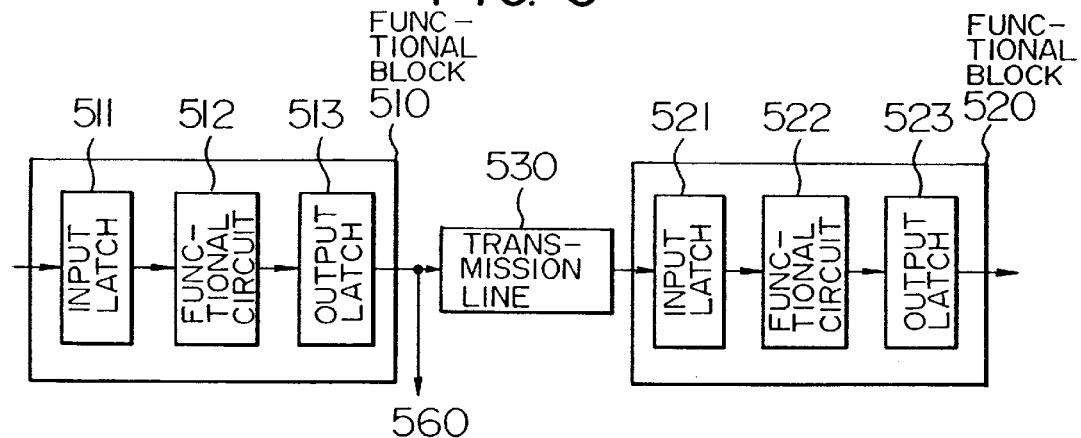
FIG. 5 is a circuit block diagram showing a third embodiment of a pipelined semiconductor device according to the present invention.

FIG. 5 shows a third embodiment of a pipelined data processing device according to the present invention. In FIG. 5, reference numerals 510 and 520 represent some functional blocks of the pipelined data processing device. The functional block 510 has an input latch 511, functional circuit 512, and output latch 513. The functional block 520 has an input latch 521, functional circuit unit 522, and output latch 523. Reference numeral 530 represents a signal transmission line which may be a wiring such as shown in FIG. 7 or a combination of a wiring and a waveform shaping buffer inserted in the midst of the wiring such as shown in FIG. 8. Reference numeral 560 represents a branched signal transmission line. In this embodiment, the signal transmission line 530 from the functional block 510 to the functional block 520 is not divided. This transmission 530 line is sandwiched between latches, and assigned one pipeline cycle.

Figure 6:
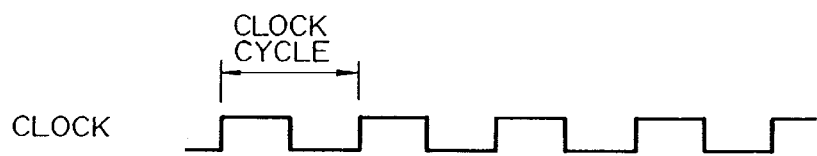
FIG. 6 is a diagram illustrating the pipeline operation of the third embodiment shown in FIG. 5.

FIG. 6 shows the pipeline operation of the embodiment shown in FIG. 5. In FIG. 6, a character "A" stands for a process stage of the functional block 510, a character "B" stands for a process stage of the functional block 520, and a character "X1" stands for a transmission stage of the signal transmission line 530. As seen from FIG. 6, a signal output from the functional block 510 is processed at the functional block 520 after one stage.

Figure 10:
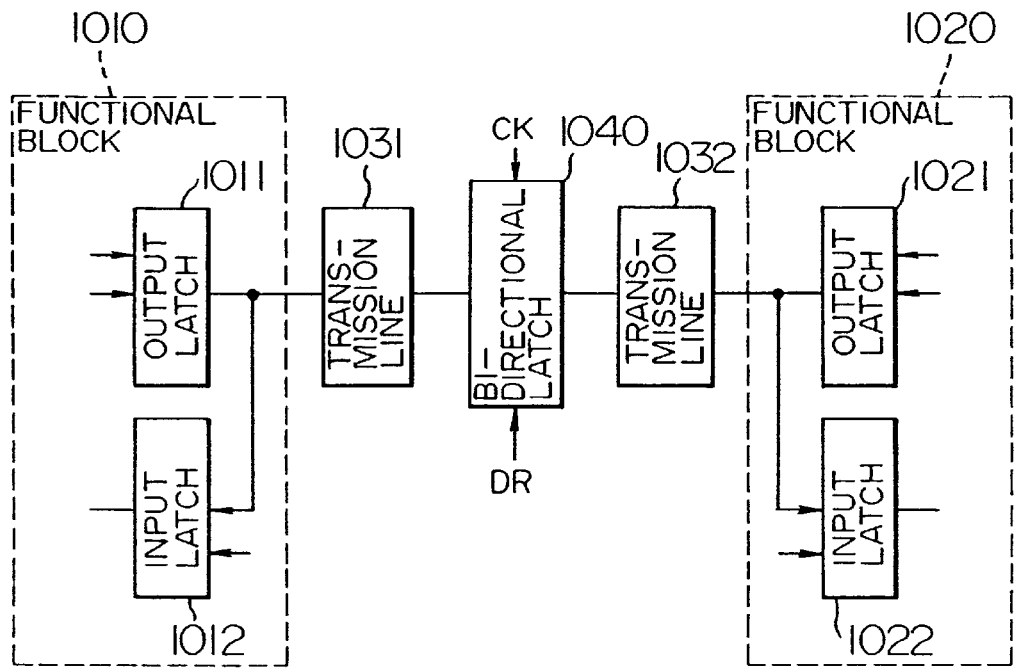
FIG. 10 is a circuit block diagram showing another embodiment of a pipelined semiconductor device with a bi-directional transmission system according to the present invention.
Figure 13:
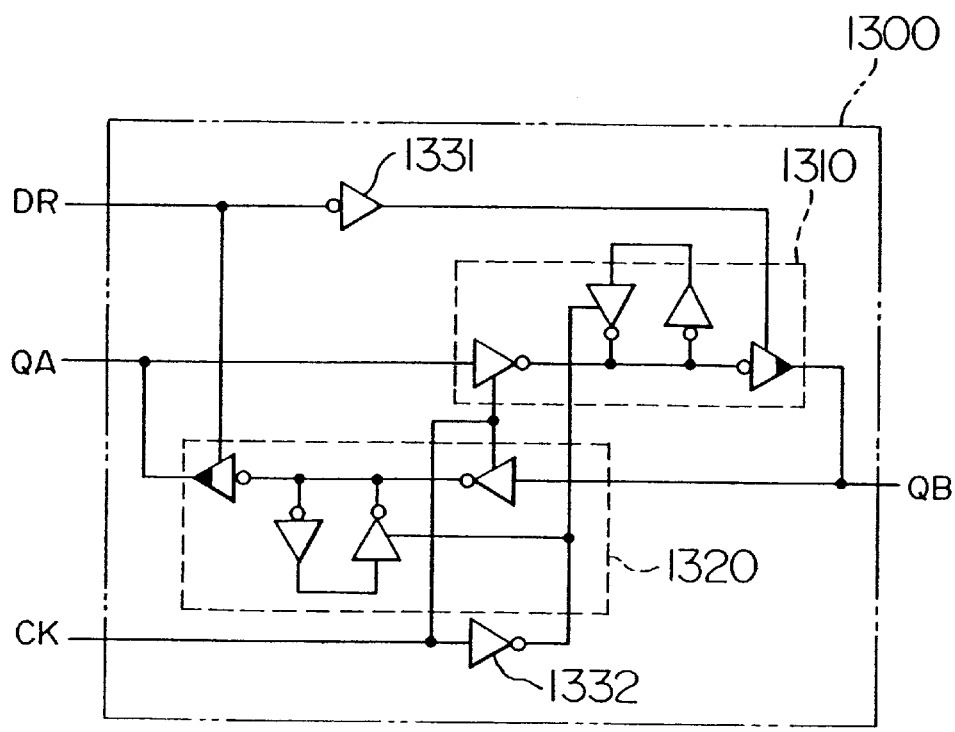
FIG. 13 is a circuit diagram showing an example of a bi-directional latch.

FIG. 10 shows a fourth embodiment of a pipelined data processing device according to the present invention. In FIG. 10, reference numerals 1010 and 1020 represent functional blocks of the pipelined data processing device. The functional block 1010 has an output latch 1011 and input latch 1012, and the functional block 1020 has an output latch 1021 and input latch 1022, the internal functional circuits of the blocks 1010 and 1020 being omitted in FIG. 10. Reference numerals 1031 and 1032 represent divided signal transmission lines. Reference numeral 1040 represents a bidirectional latch which may have the circuit such as shown in FIG. 13, although other circuits may also be used. Such a latch circuit is well known, and so the description thereof is omitted. In this embodiment, the signal transmission line from the functional block 1010 to the functional block 1020 is divided into two signal transmission lines 1031 and 1032 each sandwiched between two latches. Each divided signal transmission line is assigned one pipeline cycle.

Figure 11:
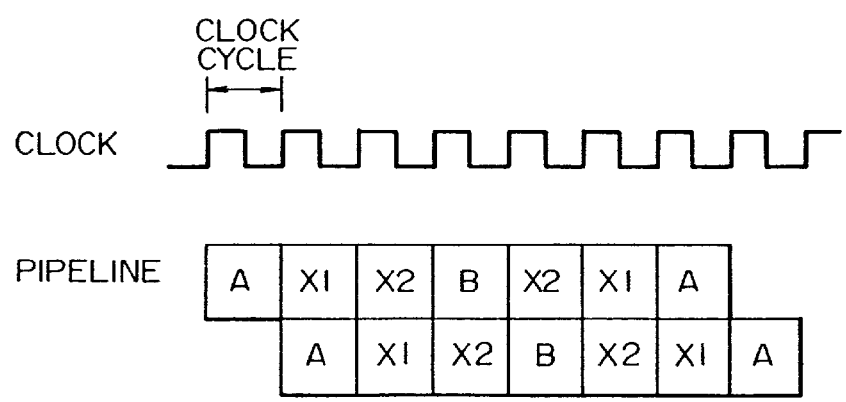
FIG. 11 is a diagram illustrating the pipeline operation for the bi-directional transmission system.

FIG. 11 shows the pipeline operation of the embodiment shown in FIG. 10. In FIG. 11, a character "A" stands for a process stage of the functional block 1010, a character "B" stands for a process stage of the functional block 1020, and characters "X1" and "X2" stand for transmission stages of the signal transmission lines 1031 and 1032. As seen from FIG. 11, a signal outputted from the functional block 1010 is processed at the functional block 1020 after two stages. Similarly, a signal output from the functional block 1020 is processed at the functional block 1010 after two stages.

Figure 14:
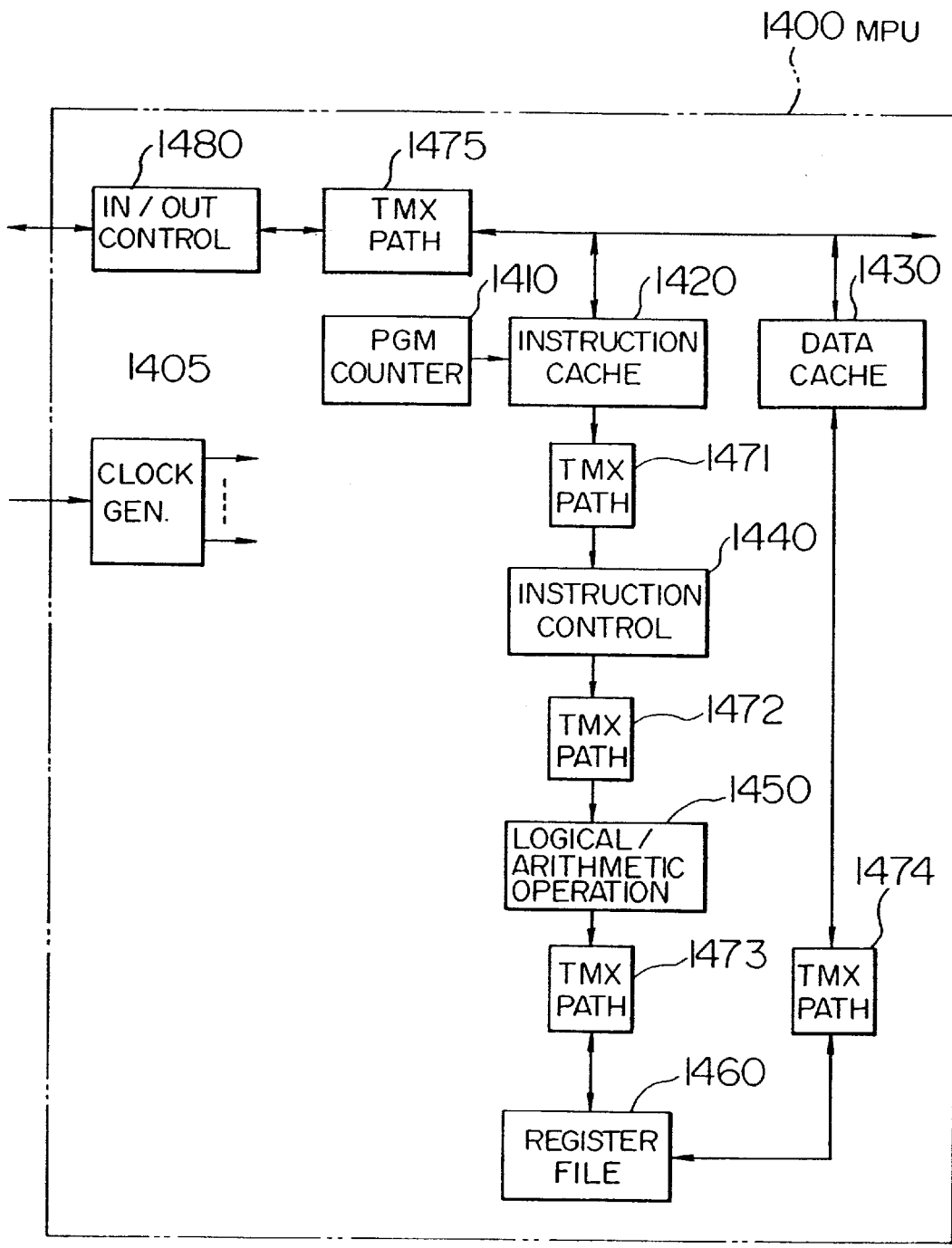
FIG. 14 is a block diagram showing an embodiment of a microprocessor according to the present invention.

FIG. 14 shows an embodiment of a microprocessor according to the present invention. In FIG. 14, reference numeral 1400 represents a microprocessor chip. Reference numeral 1405 represents a clock generator for supplying clocks to functional circuits (inclusive of latches) formed on the chip. Reference numeral 1410 represents a program counter which outputs a read address to an instruction cache 1420 storing instruction data. Reference numeral 1430 represents a data cache storing operand data. Reference numeral 1440 represents an instruction control circuit which analyzes an instruction output from the instruction cache 1420 and outputs various logical/arithmetic control signals. Reference numeral 1450 represents a logical/arithmetic unit which executes various logical/arithmetic operations of data received from a register file 1460, the operation results being written in this file 1460. Reference numerals 1471 to 1475 represent signal transmission lines each being sandwiched between latches of the functional blocks or pipeline latches.

Although a microprocessor includes a number of functional circuits other than those described above, only those sufficient for the description of the present invention are shown in FIG. 14. Whether each of the signal transmission lines 1471 to 1475 is to be divided or not, or the number N of divisions, is determined in accordance with the machine cycle time and the transmission time of each signal transmission line. The number N of divided signal transmission lines is set to $N \geq tx/\{T-(tk+tl+ts)\}$, where T is a pipeline cycle time, tk is a clock skew, tl is a latch delay time, ts is a set up time, and tx is a wiring delay time of the original signal transmission line.

Figure 15:
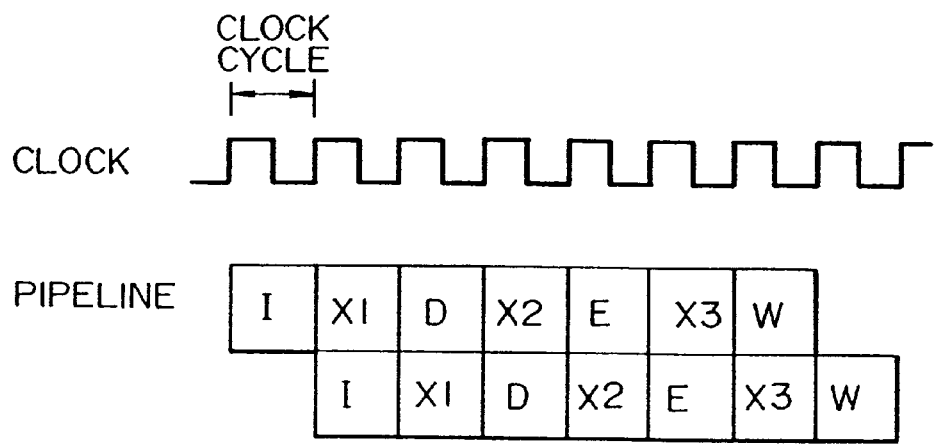
FIG. 15 is a diagram illustrating the pipeline operation of the embodiment shown in FIG. 14.

FIG. 15 shows the pipeline operation of the microprocessor shown in FIG. 14 wherein the number of divisions of each signal transmission line is set to N=1. In FIG. 15, a character "I" stands for a read stage of the instruction cache 1420, a character "D" stands for a process stage of the instruction control circuit 1440, a character "E" stands for an execution stage of the logical/arithmetic unit 1450, and a character "W" stands for a write stage of the register file 1460. Characters "X1", "X2", and "X3" stand for transmission stages of the signal transmission lines 1471, 1472, and 1473. The pipeline operation is therefore executed by seven stages.

Figure 16:
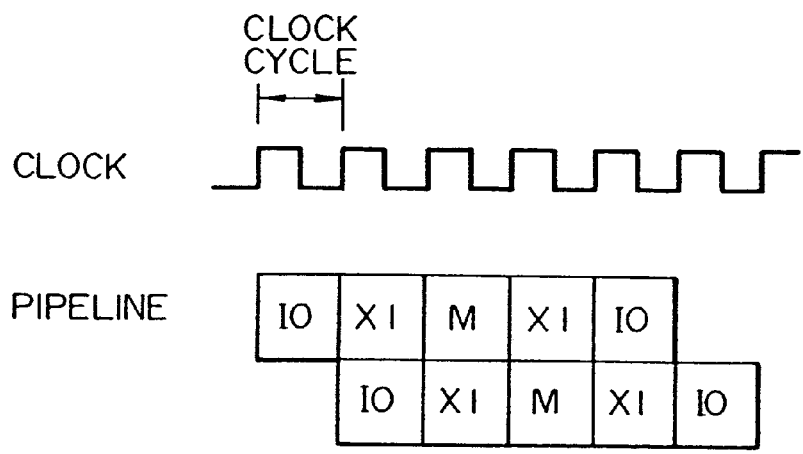
FIG. 16 is a diagram illustrating the pipeline operation between an input/output control unit and an internal memory.

FIG. 16 shows the pipeline operation for the data transfer between an input/output control circuit 1480 and the data cache 1430 shown in FIG. 14 wherein the number of divisions of the signal transmission line 1475 is set to N=1. In FIG. 16, a word "IO" stands for a process stage of the input/output control circuit 1480, a character "M" stands for a read/write stage of the data cache 1430, and a character "X1" stands for a transmission stage of the signal transmission line 1475. The pipeline operation for the data transfer between the input/output control circuit and the data cache is therefore executed by three stages.

Figure 17:
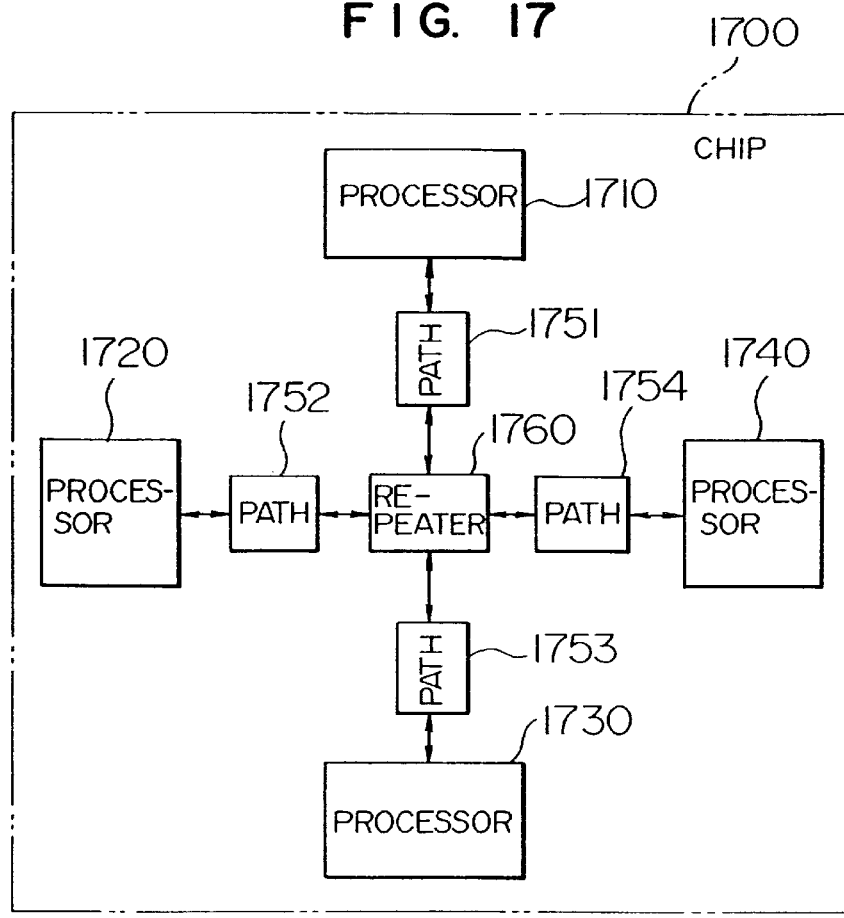
FIG. 17 is a circuit block diagram showing an embodiment of a multi-microprocessor according to the present invention.

FIG. 17 shows an embodiment of an on-chip multiprocessor to which the present invention, is applied. In FIG. 17, reference numeral 1700 represents a semiconductor chip, reference numerals 1710 to 1740 represent processors, and reference numeral 1760 represents a repeater including bus switches and a clock generator such as that shown in FIG. 19. Reference numerals 1751 to 1754 represent signal transmission lines. The repeater 1760 shown in FIG. 19 may be a processor or some type of a control circuit, the processor or control circuit having therein the circuit shown in FIG. 19.

Figure 18:
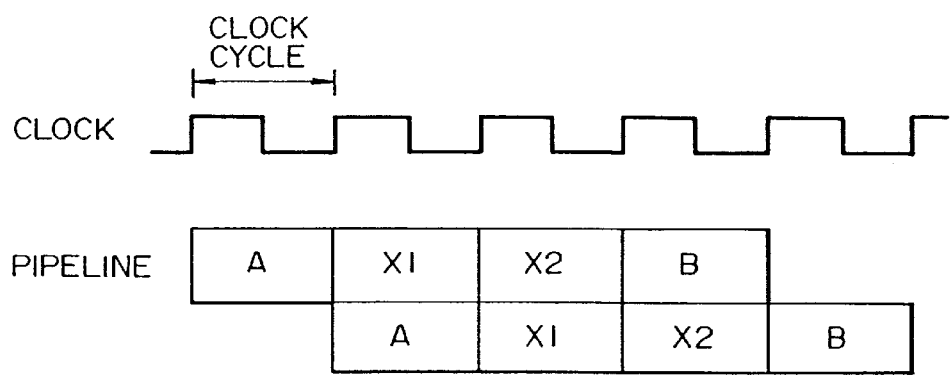
FIG. 18 is a diagram illustrating the pipeline operation of the embodiment shown in FIG. 17.

FIG. 18 shows the pipeline operation for data transfer between two processors, e.g., from the processor 1710 to the processor 1740. In FIG. 18, a character "A" stands for a process stage of the processor 1710, a character "B" stands for a process stage of the processor 1740, and characters "X1" and "X2" stand for transmission stages of the signal transmission lines 1751 and 1754. As seen from FIG. 18, a signal output from the processor 1710 is processed at the processor 1740 after two stages.

Figure 19:
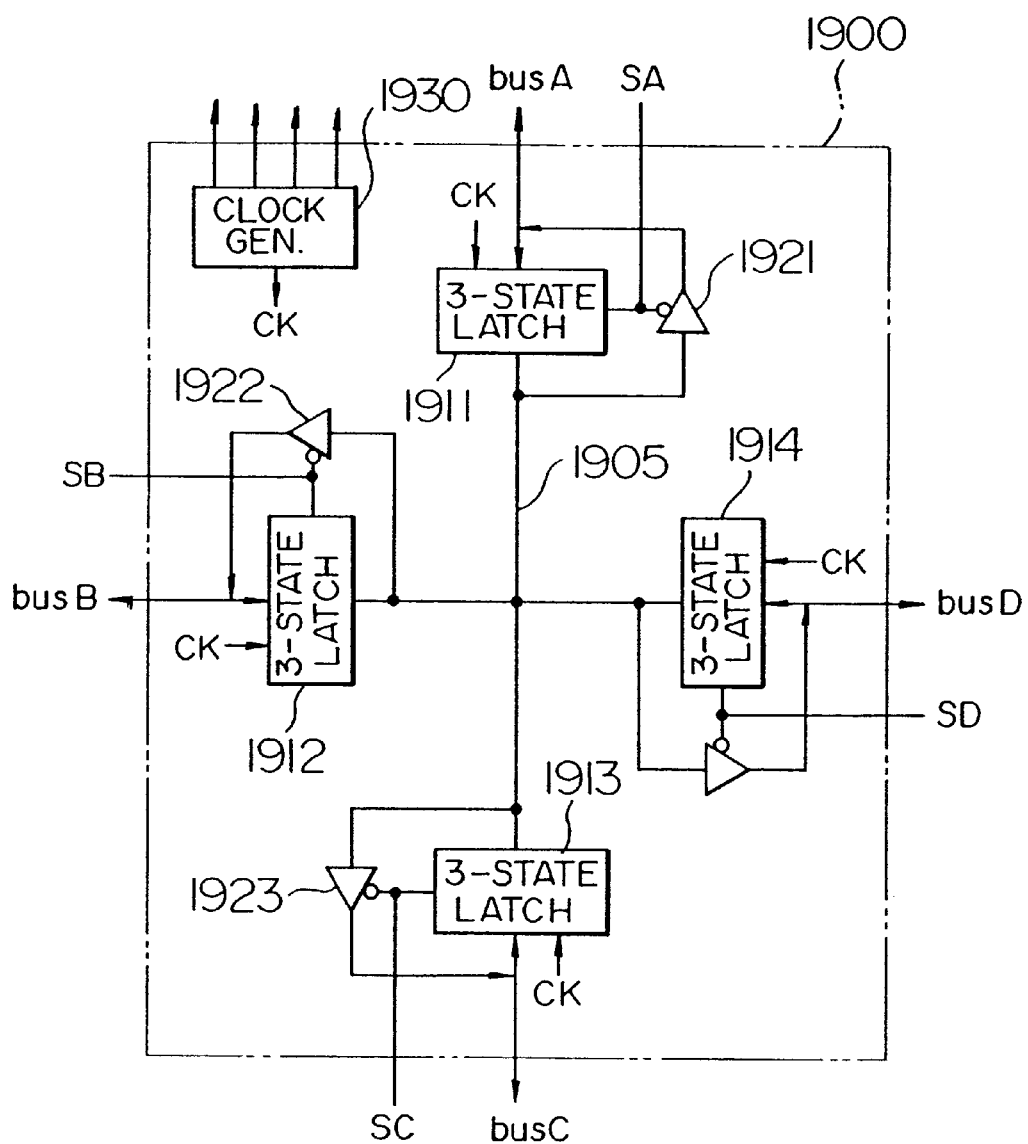
FIG. 19 is a circuit block diagram showing an embodiment of a repeater according to the present invention.

FIG. 19 shows an example of the repeater 1760 of the embodiment shown in FIG. 17. In FIG. 19, the repeater is generally designated by reference numeral 1900, only the internal circuits necessary for the description of the present invention being shown and other circuits being omitted. Reference numerals 1911 to 1914 represent three-state latches, each of which receives a signal on a corresponding one of buses A to D in response to a clock signal CK, and outputs it to a common line 1905 if a corresponding one of output control signals SA to SD takes a high level at that time. If the output control signal SA to SD takes a low level or "O", the output of the corresponding latch becomes of a high impedance state. Reference numerals 1921 to 1924 represent three-state drivers each, of which allows the signal on the common line 1905 to be output to a corresponding one or ones of the buses A to D if a corresponding one or ones of the control signals SA to SD take a low level. The output of the three-state driver becomes of a high impedance state if the control signal takes a high level. For example, if a signal from the bus A is to be output to the buses B to D, the control signal SA is set to the high level, and the control signals SB to SD are set to the low level. In this embodiment, the three-state latches 1191 to 1194 and corresponding three-state drivers 1921 to 1924 are controlled in unison by the control signals SA, SB, SC, and SD. However, the three-state latches and drivers may be controlled separately by using control signals provided for the latches and control signals provided for the drivers. Reference numeral 1930 represents a clock generator which generates the clock signal CK for the repeater 1900 and clock signals CKA to CKD for the processors 1710 to 1740 shown in FIG. 17. The provision of the clock generator within the repeater shortens wirings to each processor and makes it easy to have the same length of each wiring, thereby effectively reducing the clock skew.

Figure 20:
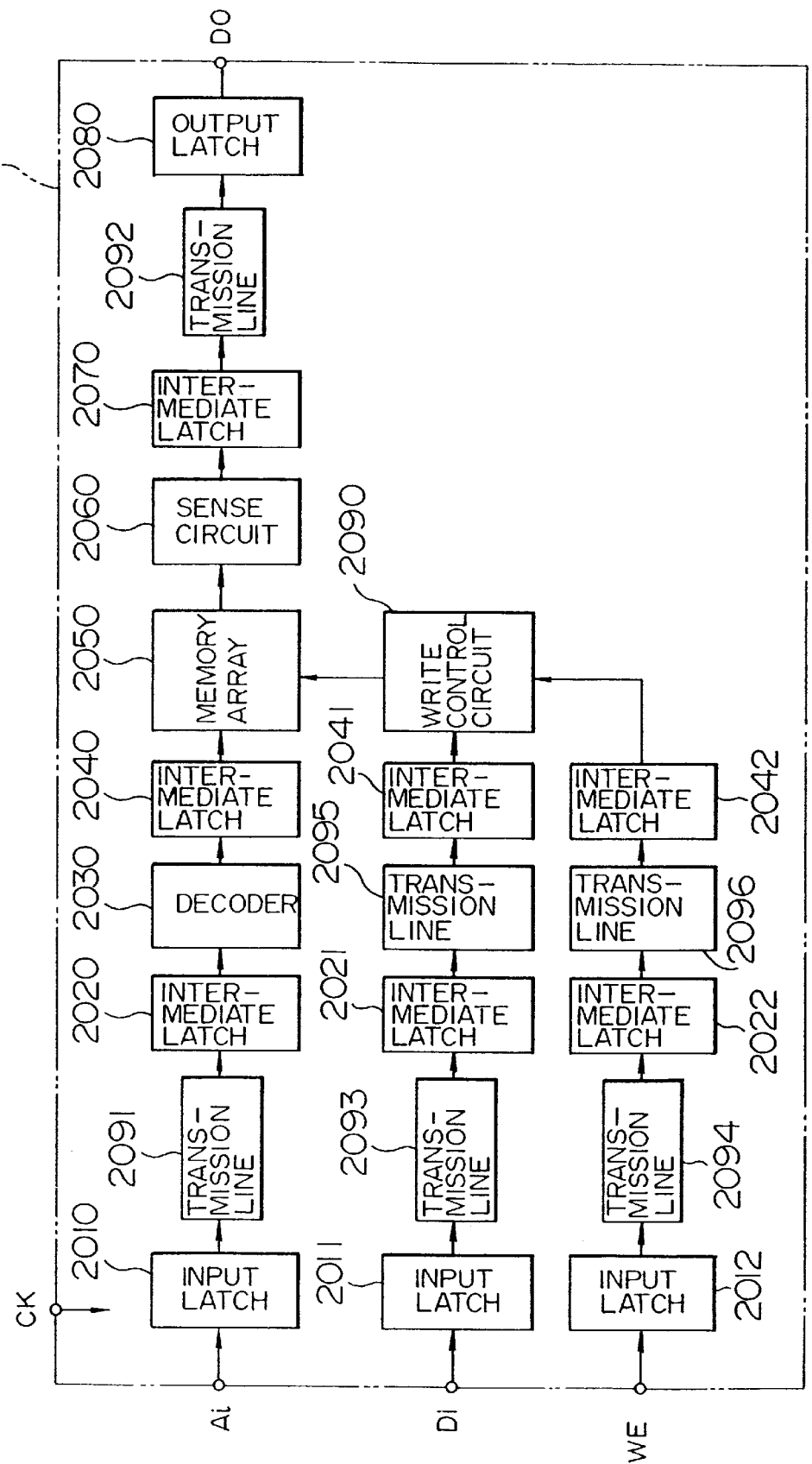
FIG. 20 is a circuit block diagram showing an embodiment of a semiconductor memory device according to the present invention.

FIG. 20 shows an example of a pipelined semiconductor memory device to which the present invention was applied. In FIG. 20, reference numeral 2000 generally represents a memory chip which receives an address signal Ai, data signal Di, and write signal WE#. In the read access mode, it executes a pipeline operation synchronously with a clock signal CK to output data DO. Reference numerals 2010 to 2012 represent input latches. Reference numerals 2020 to 2022, 2040 to 2042, and 2070 represent intermediate latches, and reference numeral 2080 represents an output latch. Reference numeral 2030 represents a decoder, reference numeral 2050 represents a memory array, reference numeral 2060 represents a sense circuit, and reference numeral 2090 represents a write control circuit. These circuits are main functional circuits of the semiconductor memory device. Reference numerals 2091 to 2096 represent signal transmission lines whose equivalent circuit models are shown in FIGS. 7 and 8. Consider now the read access operation. One pipeline stage cycle is assigned to the signal transmission line 2091 and the latches 2010 and 2020 sandwiching the line 2091, provided between the address input Ai and the decoder 2030. One pipeline stage cycle is assigned to the decoder 2030 and the latches 2020 and 2040 sandwiching the decoder 2030, and also to the memory array 2050 and sense circuit 2060 and the latches 2040 and 2070 sandwiching the memory array and sense circuit. Another pipeline stage cycle is assigned to the signal transmission line 2092 and the latches 2070 and 2080 sandwiching the line 2092, provided between the sense circuit 2060 and the read output DO. The pipeline operation of the memory device is therefore executed by four stages, one stage being assigned to outputting the read data DO.

In the write access operation, a data input Di passes through the signal transmission lines 2093 and 2095 each sandwiched by two latches, and reaches the write control circuit 2090 after two stages. Similarly, the write control signal WE# passes through the signal transmission lines 2094 and 2096 each sandwiched by two latches, and reaches the write control circuit 2090 after two stages. The input data is then written in the memory array 2050 at a present address.

FIG. 21 shows the pipeline operation for the read access and write access wherein all the signal transmission lines each are assigned one pipeline stage cycle. In FIG. 21, a character "D" stands for an operation stage of the decoder 2030, a character "S" stands for an operation stage of the memory array 2050 and sense circuit 2060, a character "O" stands for an output stage of the read data DO, and a character "W" stands for an operation stage of the write control circuit 2090. Characters "X1", and "X2" stand for transmission stages of the signal transmission lines.

Figure 22:
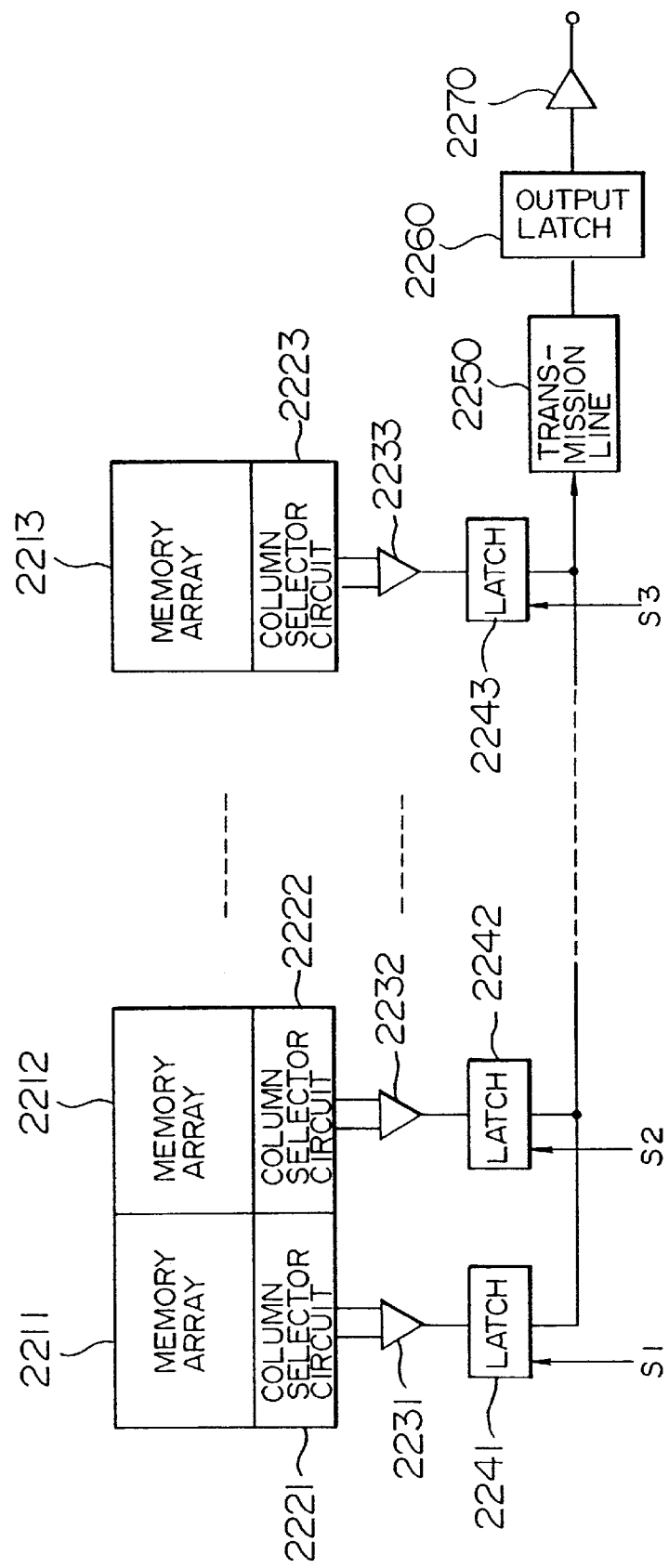
FIG. 22 is a circuit block diagram showing the details of the circuit portion of the semiconductor memory device shown in FIG. 20.
Figure 23:
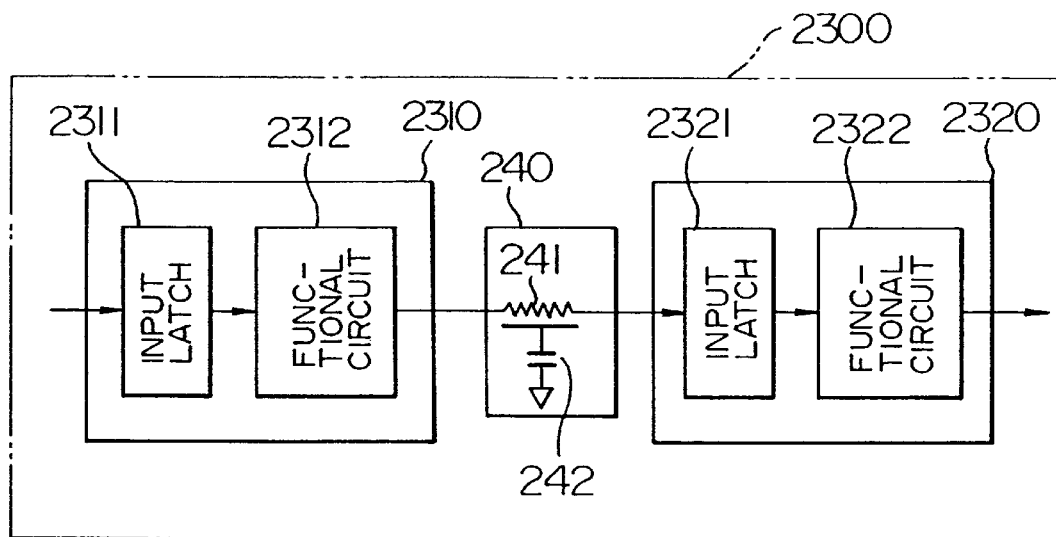
FIG. 23 is a circuit block diagram showing a conventional data processing device.
Figure 24:
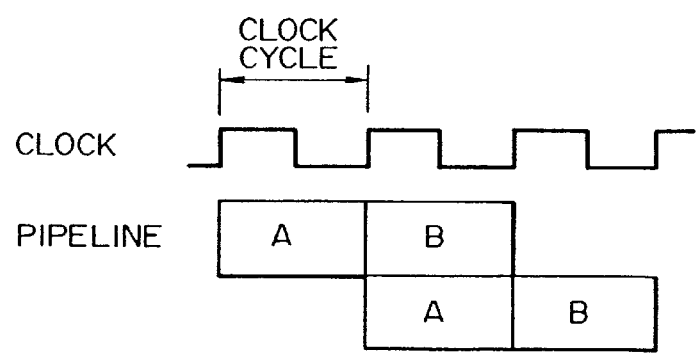
FIG. 24 is a diagram illustrating the pipeline operation of the data processing device shown in FIG. 23.
Figure 25:
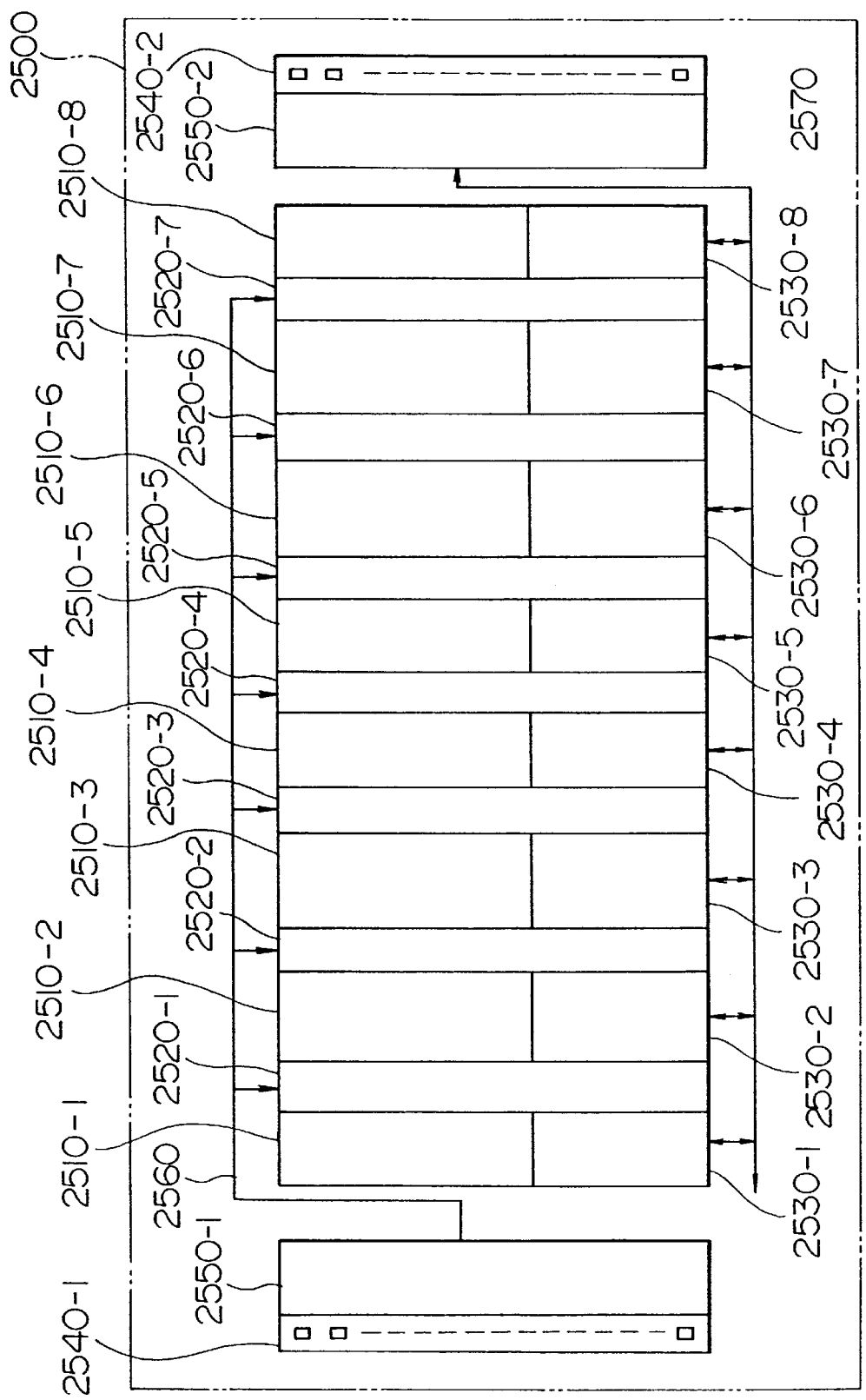
FIG. 25 is a schematic circuit diagram showing the layout of a conventional semiconductor memory device.

FIG. 22 is a detailed circuit diagram of the circuit portion from the memory array 2050 to the read data output DO shown in FIG. 20. In FIG. 22, reference numerals 2211 to 2213 represent memory arrays, reference numerals 2221 to 2223 represent column selector circuits, reference numerals 2231 to 2233 represent sense circuits, reference numerals 2241 to 2243 represent latches, reference numeral 2250 represents a signal transmission line for sending an output from each latch to an output latch 2260, and reference numeral 2270 represents an output buffer. The signal transmission line 2250 is a long wiring extending in the longitudinal direction of the chip as described with the prior art shown in FIG. 25. The signal transmission line 2250 is therefore sandwiched between the latches 2260, 2241 to 2243, and assigned N pipeline stage cycles in total.

Figure 27:
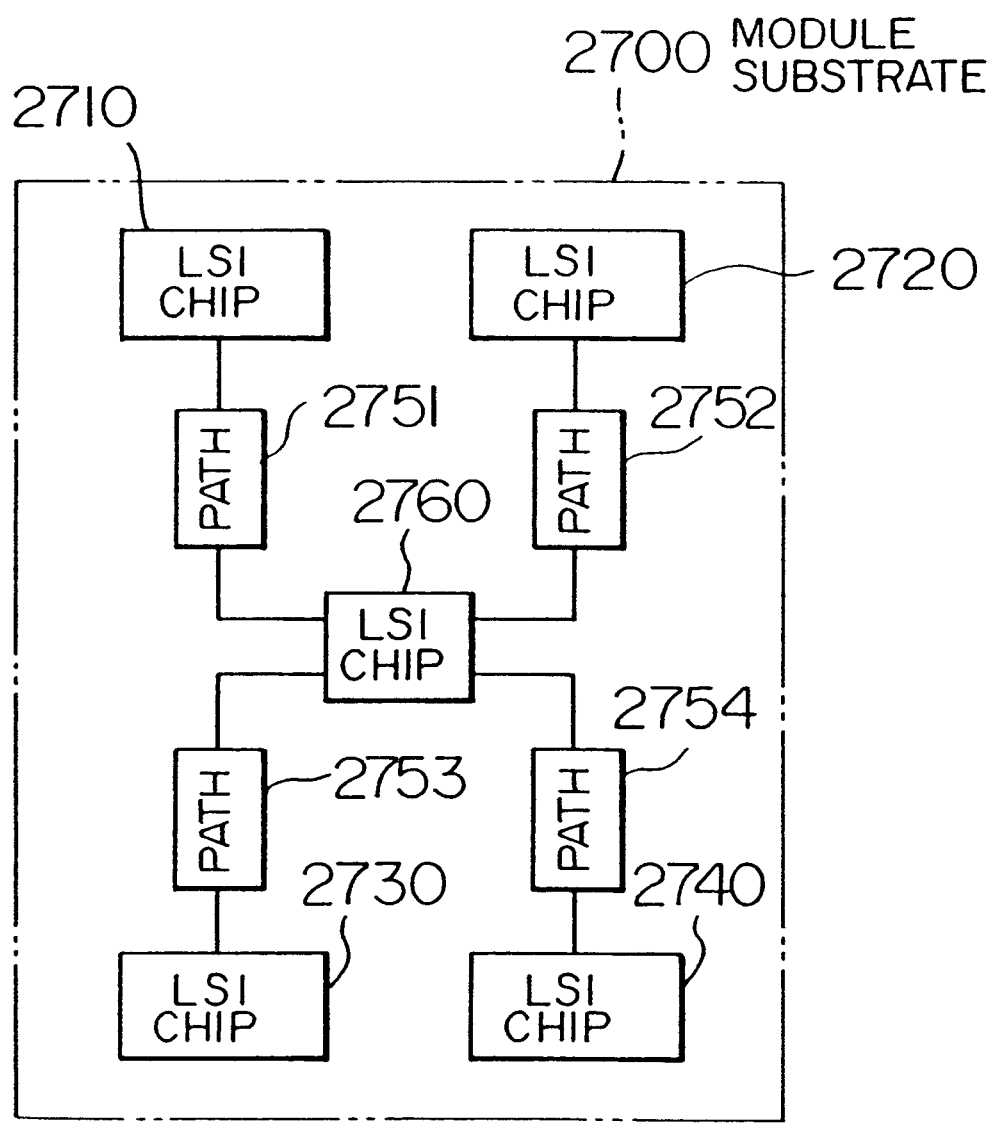
FIG. 27 is a circuit block diagram showing an embodiment of a multi-chip module system according to the present invention.

FIG. 27 shows an embodiment of a multi-chip module system to which the present invention was applied. In FIG. 27, reference numeral 2700 represents a module substrate made of silicon or ceramics. Reference numerals 2710 to 2740 represent LSI chips such as data processing devices and memory devices. Reference numeral 2760 represents a repeater chip having at least a bus switch such as shown in FIG. 19. Reference numerals 2751 to 2754 represent signal transmission lines for inter-connecting the LSI chips and repeater chip. The repeater chip 2760 shown in FIG. 27 may be a data processing device, a processor, or some type of a control circuit. Such data processing device, processor or control circuit has therein the circuit with the bus switch and the like shown in FIG. 19. Generally the signal transmission lines 2751 to 2754 on the module substrate are longer than those formed on an LSI chip and have a longer transmission delay time, which is a main factor of lowering the performance of a multi-chip module system. In this embodiment, the number N of divisions of each signal transmission line 2751 to 2754 is determined basing upon the operation frequency of each LSI chip 2710 to 2740. Each divided signal transmission line is assigned one pipeline stage cycle. In this manner, the maximum performance of the multi-chip module system can be realized.

As described so far, according to the present invention, without the development of new technology which realizes the above-described solutions (1) to (4), the frequency of the pipeline operation can be raised easily.

Figure 26:
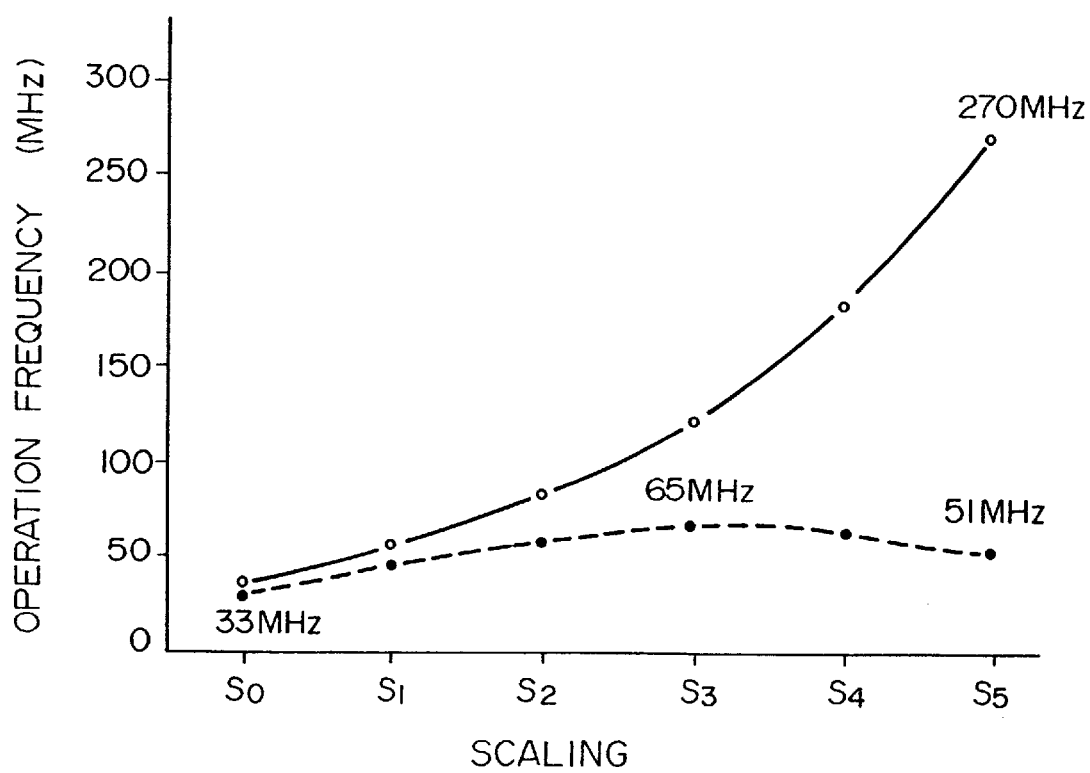
FIG. 26 is a graph showing a relationship between scaling and operation frequencies.

According to the present invention, the pipeline operation for microprocessors, various data processing devices, memory devices can be speeded up obtaining a high performance, without being affected by an increase in the wiring delay time to be caused by the development of fine processing as indicated by the solid line curve of the graph shown in FIG. 26. Accordingly, without waiting for a new development of technology such as a new wiring material and a new three-dimensional wiring layout, the improved device performance through fine processing and the improved circuit performance will provide a higher operation frequency and high performance of pipelined semiconductor devices.

Since fine wiring can be made without considering its signal delay, high integration becomes possible. Since a large buffer of high speed and high drive capability is not required to drive a long wiring, high integration becomes possible and switching noises of the buffer can be reduced. Since it is not necessary to consider a wiring signal delay, the degree of design freedom of the layout of functional blocks becomes high, providing an easy design.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A multi-processor having M microprocessors and a repeater integrally fabricated on a semiconductor chip, comprising:

M signal transmission buses on the semiconductor chip assigned to M microprocessors (M being a positive integer);

N ($\geq 1$) signal transmission pipeline stages for signal transmission between each of the M microprocessors and the repeater including a pipeline latch wherein N is given by $N \geq tx/(T-(tk+tl+ts))$, wherein T is a pipeline cycle time, tk is a clock skew, tl is a delay time of the pipeline latch, and tx is a total wiring delay time of said signal transmission buses; and 2 N ($N \geq 1$) signal transmission pipeline stages for signal transmission between two of said M microprocessors.

2. A multi-microprocessor according to claim 1, wherein a signal transmission line corresponding to said signal transmission pipeline stages is constructed of only a wiring disposed between pipeline latches connecting each microprocessor.

3. A multi-microprocessor according to claim 1, wherein a signal transmission line corresponding to said signal transmission pipeline stages is constructed of a wiring disposed between pipeline latches connecting each microprocessor and a delay element or waveform shaping buffer inserted at the midst of said wiring.

4. A multi-microprocessor having M microprocessors integrally fabricated on a semiconductor chip according to claim 1, wherein said M microprocessors are disposed to enclose a repeater including said pipeline latches.

5. A multi-microprocessor having M microprocessors integrally fabricated on a semiconductor chip according to claim 1, wherein said repeater for controlling the signal transmission between microprocessors is constructed of only bus switching means including a pipeline latch.

6. A multi-microprocessor having M microprocessors integrally fabricated on a semiconductor chip according to claim 1, wherein said repeater for controlling the signal transmission between microprocessors includes bus switching means including a pipeline latch, and a clock generator being applied to pipeline latches.

7. A multi-microprocessor having M microprocessors integrally fabricated on a semiconductor chip according to claim 1, wherein said repeater for controlling the signal transmission between microprocessors is one of a data processing device, a memory device, and a functional device each including bus switch means having a pipeline latch.

8. A multi-chip module system having a plurality of LSI chips and a repeater on a module substrate, comprising:

M signal transmission buses on the multi-chip module assigned to M LSI chips (M being a positive integer); and N ($N \geq 1$) signal transmission pipeline stages for signal transmission between two of said LSI chips, wherein the highest operation frequency of the system is determined based on the rated lowest operation frequency of said plurality of LSI chips, and wherein N is given by $N \geq tx/(T-(tk+tl+ts))$, where T is a pipeline cycle time, tk is a clock skew, tl is a delay time of the pipeline latch, and tx is a total wiring delay time of said signal transmission buses.

9. A multi-chip module system having a plurality of LSI chips and a repeater on a module substrate according to claim 8, wherein said N ($N \geq 1$) signal transmission pipeline stages connecting together each LSI chip and the repeater including a pipeline latch, and 2N ($N \geq 1$) signal transmission pipeline stages connecting together two LSI chips, and wherein the highest operation frequency of the system is determined based on the rated lowest operation frequency of said plurality of LSI chips.

10. A multi-chip module system having a plurality of LSI chips on a module substrate according to claim 8, wherein said repeater for controlling the signal transmission between LSI chips is constructed of only bus switching means including a pipeline latch.

11. A multi-chip module system having a plurality of LSI chips on a module substrate according to claim 8, wherein said repeater for controlling the signal transmission between LSI includes bus switching means including a pipeline latch, and a clock generator being applied to pipeline latches.

12. A multi-chip module system having a plurality of LSI chips on a module substrate according to claim 8, wherein said repeater for controlling the signal transmission between LSI chips is one of a data processing device, a memory device, and a functional device each including bus switch means having a pipeline latch.

* * * * *